United States Patent
Luginbuhl et al.

(10) Patent No.: US 10,257,526 B2
(45) Date of Patent: Apr. 9, 2019

(54) PERCEPTUAL COLOR TRANSFORMATIONS FOR WIDE COLOR GAMUT VIDEO CODING

(71) Applicants: Disney Enterprises, Inc., Burbank, CA (US); Eidgenoessische Technische Hochschule Zurich (ETH Zurich), Zurich (CH)

(72) Inventors: Daniel Luginbuhl, Zurich (CH); Tunc Ozan Aydin, Zurich (CH); Aljosa Smolic, Aarau (CH); Nikolce Stefanoski, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 688 days.

(21) Appl. No.: 14/862,027

(22) Filed: Sep. 22, 2015

(65) Prior Publication Data
US 2016/0323556 A1  Nov. 3, 2016

Related U.S. Application Data

(60) Provisional application No. 62/156,124, filed on May 1, 2015.

(51) Int. Cl.
*H04N 19/186* (2014.01)
*G06T 5/00* (2006.01)
(Continued)

(52) U.S. Cl.
CPC ........... *H04N 19/186* (2014.11); *G06T 5/007* (2013.01); *H04N 9/67* (2013.01); *H04N 19/124* (2014.11); *H04N 19/85* (2014.11)

(58) Field of Classification Search
None
See application file for complete search history.

(56) References Cited

U.S. PATENT DOCUMENTS 6,100,998 A * 8/2000 Nagao ................... G06K 15/02
  358/1.9
8,783,901 B2 * 7/2014 Zoorob .................... F21K 9/00
  362/230
(Continued)

FOREIGN PATENT DOCUMENTS

CN   1875398 A   12/2006
CN   103563376 A   2/2014
(Continued)

OTHER PUBLICATIONS

Farbman et al., Coordinates for instant image cloning, ACM Trans. Graph., Jul. 2009, pp. 1-9, 28(3):67.
(Continued)

*Primary Examiner* — Dave Czekaj
*Assistant Examiner* — Tyler W. Sullivan
(74) *Attorney, Agent, or Firm* — Sheppard Mullin Richter & Hampton LLP

(57) ABSTRACT

A video coding pipeline is provided that can accommodate high dynamic range (HDR) and wide color gamut (WCG) content at a fixed bitrate. The video coding pipeline relies on separate chromaticity and luminance-specific transforms in order to process image content. Image content may be converted into a nearly perceptually uniform color space for coding in constant luminance. Moreover, chromaticity transforms are utilized which reduce coding errors in the chroma components (at the fixed bitrate) by enlarging the distribution of code words for compression.

20 Claims, 13 Drawing Sheets

(51) Int. Cl.
*H04N 19/85* (2014.01)
*H04N 19/124* (2014.01)
*H04N 9/67* (2006.01)

(56) References Cited

U.S. PATENT DOCUMENTS

| | | | |
|---|---|---|---|
| 9,584,811 B2* | 2/2017 | Su | H04N 19/176 |
| 2004/0096104 A1* | 5/2004 | Terekhov | H04N 1/6058 |
| | | | 382/167 |
| 2005/0184998 A1* | 8/2005 | Yang | G09G 3/3406 |
| | | | 345/589 |
| 2007/0086027 A1* | 4/2007 | Tin | G09G 5/02 |
| | | | 358/1.9 |
| 2008/0259400 A1* | 10/2008 | Hersch | B41M 3/144 |
| | | | 358/2.1 |
| 2009/0285475 A1* | 11/2009 | Suzuki | H04N 1/6058 |
| | | | 382/162 |
| 2010/0060911 A1* | 3/2010 | Marcu | G09G 5/02 |
| | | | 358/1.9 |
| 2010/0086226 A1* | 4/2010 | Rozzi | H04N 1/6058 |
| | | | 382/254 |
| 2014/0105277 A1 | 4/2014 | Bivolarsky | |
| 2015/0103902 A1* | 4/2015 | Li | H04N 19/30 |
| | | | 375/240.12 |
| 2015/0116740 A1* | 4/2015 | Miyanaga | H04N 1/6008 |
| | | | 358/1.9 |
| 2016/0309154 A1* | 10/2016 | Rusanovskyy | H04N 19/159 |
| 2016/0366449 A1* | 12/2016 | Stessen | H04N 9/77 |
| 2018/0007372 A1* | 1/2018 | Lasserre | H04N 19/85 |

FOREIGN PATENT DOCUMENTS

| | | |
|---|---|---|
| CN | 103827956 A | 5/2014 |
| CN | 104486605 A | 4/2015 |

OTHER PUBLICATIONS

Ford, Adrian, Colour space conversions, Aug. 1998, pp. 1-31.
Klaus, Simon, Farbe im Digitalen Publizieren, Springer, 2008, English abstract translation.
Luthra et al., Draft requirements and explorations for hdr and wcg content distribution, International Organisation for Standardisation, Apr. 2014, pp. 1-22, Valencia, Spain.
Luthra et al., Test sequences and anchor generation for hdr and wide gamut content distribution, International Organisation for Standardisation, Jul. 2014, pp. 1-15, Sapporo, Japan.
Pedzisa, Maciej Pedzisz, Beyond bt.709, SMPTE Motion Imaging Journal, 2014, pp. 1-8, 123:18-25.
Schubert, E. Fred, Chapter 17: Colorimetry, http://www.ecse.rpi.edu/~schubert/Light-Emitting-Diodes-dot-org/chap17/chap17.htm, last accessed Mar. 21, 2016, pp. 1-15.
Sullivan, et al., Overview of the high efficiency video coding (hevc) standard, IEEE Transactions on Circuits and Systems for Video Technology, Dec. 12, 2012, pp. 1649-1668, 22(12).
First Office Action in Chinese Patent Application No. 2016102814925, dated Aug. 3, 2018.

* cited by examiner

CONVERT ADDITIVE COLOR MODEL SIGNAL INTO UNIFORM COLOR SPACE SIGNAL HAVING CHROMATICITY COMPONENTS
100

TRANSFORM THE CHROMATICITY COMPONENTS AND THE LUMINANCE COMPONENT BY APPLYING A CHROMATICITY-SPECIFIC TRANSFORM TO THE CHROMATICITY COMPONENTS AND APPLYING A LUMINANCE-SPECIFIC TRANSFORM APPLIED TO THE LUMINANCE COMPONENT
102

QUANTIZE THE TRANSFORMED CHROMATICITY COMPONENTS AND LUMINANCE COMPONENT
104

ENCODE THE QUANTIZED CHROMATICITY COMPONENTS AND LUMINANCE COMPONENT
106

FIG. 1

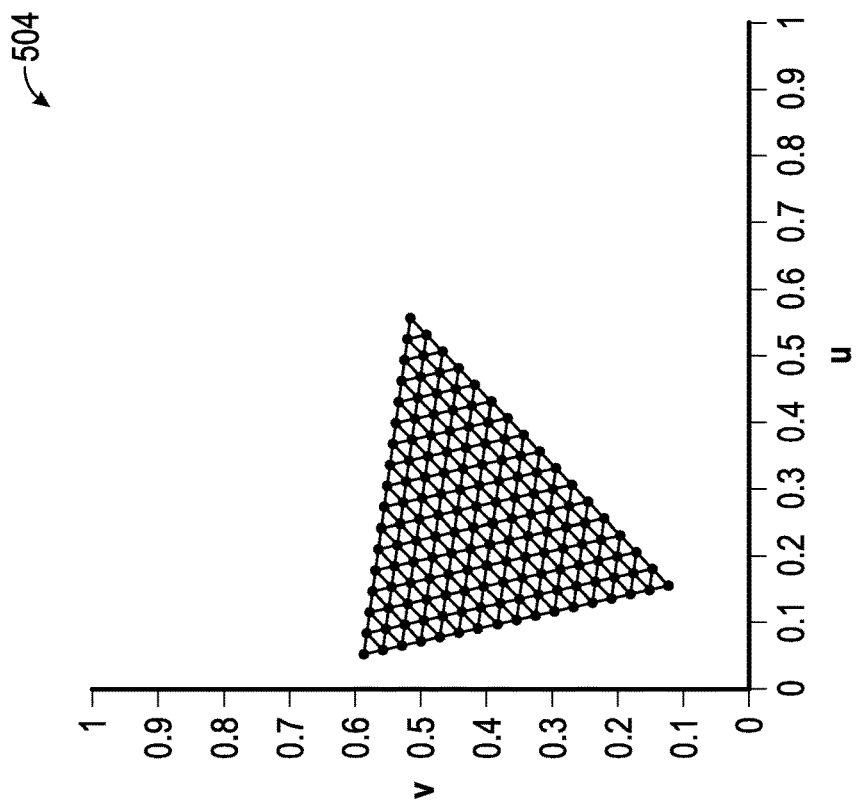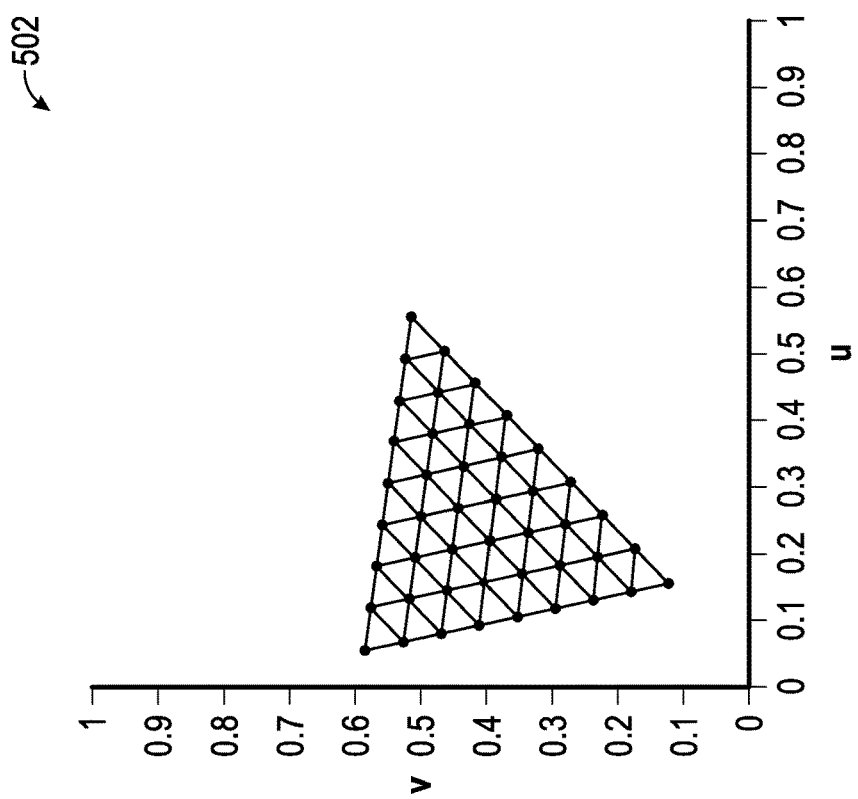
FIG. 5

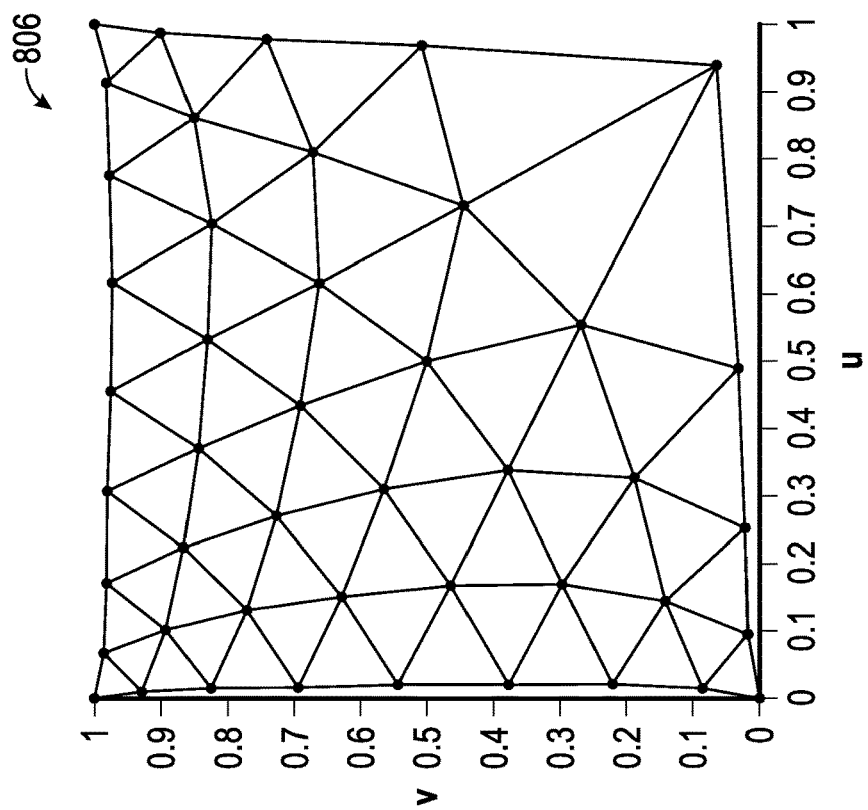
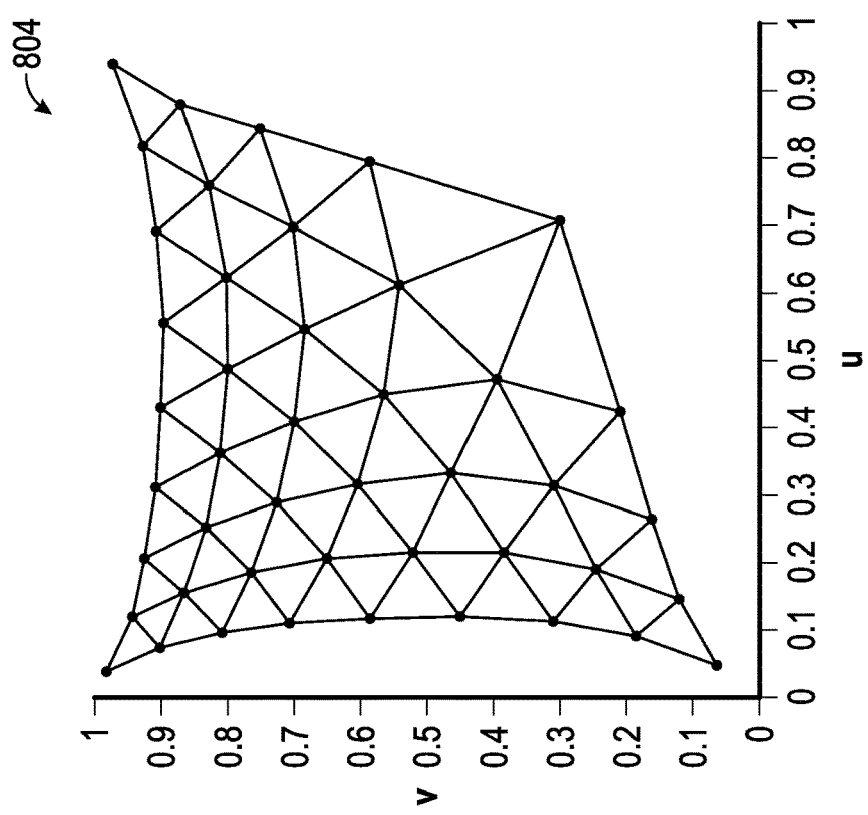
FIG. 8B

PERCEPTUAL COLOR TRANSFORMATIONS FOR WIDE COLOR GAMUT VIDEO CODING

CROSS-REFERENCE TO RELATED APPLICATIONS

This application claims the benefit of U.S. Provisional Patent Application No. 62/156,124 filed on May 1, 2015, which is incorporated herein by reference in its entirety.

TECHNICAL FIELD

The present disclosure relates generally to video coding.

DESCRIPTION OF THE RELATED ART

Interest in distributing video or other visual content having high dynamic range (HDR) and wide color gamut (WCG) is growing due to its ability to provide a viewing experience that is more enhanced when compared to conventional standard dynamic range (SDR) and standard color gamut (SCG) content. SDR content typically has a brightness of e.g., 0.1 to 100 nits, a range that is significantly less than that which the human eye can see in real life. However, footage that is filmed or re-mastered in HDR and WCG contains more information, which in turn necessitates larger file sizes along with increased bitrate.

BRIEF SUMMARY OF THE DISCLOSURE

Various embodiments are directed to providing better content (e.g., picture) quality at a fixed bitrate through the use of a constant luminance coding pipeline in which image content is converted into a nearly perceptually uniform luminance/chrominance (Y/U'V') color space. Additionally, various chromaticity transforms (performed using a dedicated chromaticity transform separate and distinct from the luminance transform) are disclosed for use in the coding pipeline.

In accordance with one embodiment of the present disclosure, a computer-implemented method comprises converting an additive color model signal into a uniform color space signal having chromaticity components and a luminance component. The computer-implemented method further comprises transforming the chromaticity components and the luminance component by applying a chromaticity-specific transform to the chromaticity components and applying a luminance-specific transform to the luminance component. Additionally still, the computer-implemented method comprises quantizing the transformed chromaticity components and luminance component, and encoding the quantized chromaticity components and luminance component.

In accordance with another embodiment of the present disclosure, a non-transitory computer readable medium has computer executable program code embodied thereon, the computer executable program code configured to cause a processor to: decode quantized color and brightness components of an input bitstream carrying an image signal represented by a first color space model having brightness and color components; dequantize the quantized color and brightness components; apply a first inverse transform to the dequantized color component; apply a second inverse transform to the dequantized brightness component; and convert the image signal represented by a first color space model into that represented by a second color space model, the second color space model being an additive color space model.

In accordance with yet another embodiment of the present disclosure, a system comprises a converter to convert an image signal represented by a first color space model into that represented by a second color space model having brightness and color components. The system further includes a first transformer to apply a first transform to the color component, an opto-electrical transfer function encoder to apply a second transform to the brightness component, a quantizer to quantize the transformed color and brightness components, and an encoder to encode the quantized color and brightness components and output a bitstream.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1 is a flow chart illustrating example operations that can be performed to achieve a constant luminance coding pipeline with a dedicated chromaticity transform in accordance with various embodiments.

FIG. 5 is an example representation of subdividing a color space into a mesh in order to apply the chromaticity transform that may be utilized in the constant luminance coding pipeline with a dedicated chromaticity transform of FIG. 1.

FIG. 8B is an example representation of an optimized least squares chromaticity transform that can be applied in the constant luminance coding pipeline with a dedicated chromaticity transform of FIG. 1.

The figures are not exhaustive and do not limit the present disclosure to the precise form disclosed.

DETAILED DESCRIPTION

In contrast to conventional, non-constant luminance video coding pipelines, various embodiments disclosed herein provide a constant luminance coding pipeline with a dedicated chromaticity transform. As discussed above, footage in HDR and WCG contains more information than SDR, which necessitates more storage space or increased bitrate for distribution. Because the bitrate might be too high for certain distribution channels, there is a need for higher compression efficiency.

FIG. 1 illustrates example operations performed in accordance with various embodiments for achieving more efficient color (SCG as well as WCG) video coding through the use of a constant luminance coding pipeline with a dedicated chromaticity transform. FIG. 1 will be described in conjunction with FIG. 2B, a schematic representation of such a coding pipeline. Coding pipeline 201 may be thought of as having a pre-processing portion 209 and a coding portion (embodied by encoder 210).

Figure 2A:
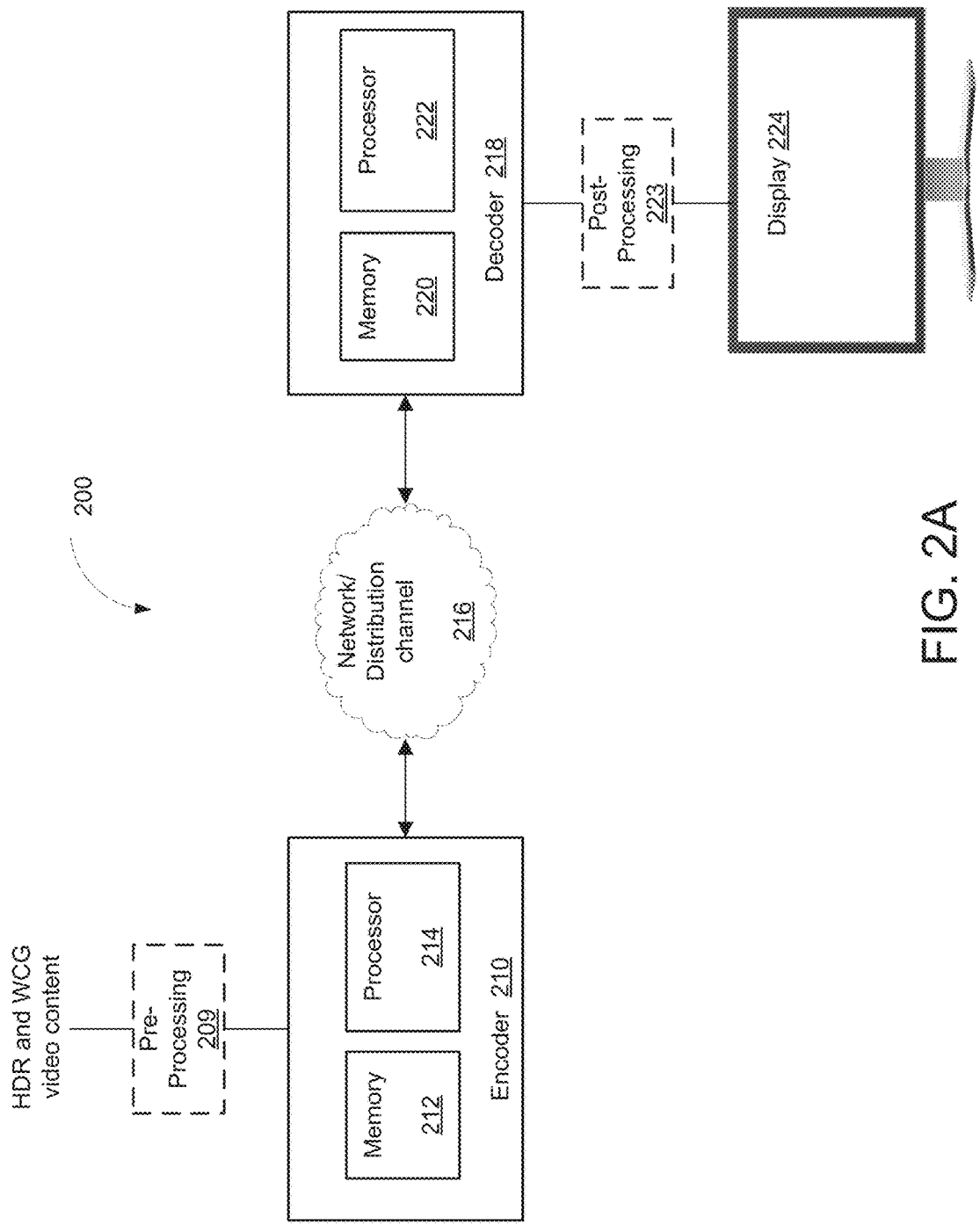
FIG. 2A is a schematic representation of a video processing pipeline in which the constant luminance coding pipeline with a dedicated chromaticity transform of FIG. 1 may be implemented in accordance with various embodiments.
Figure 2B:
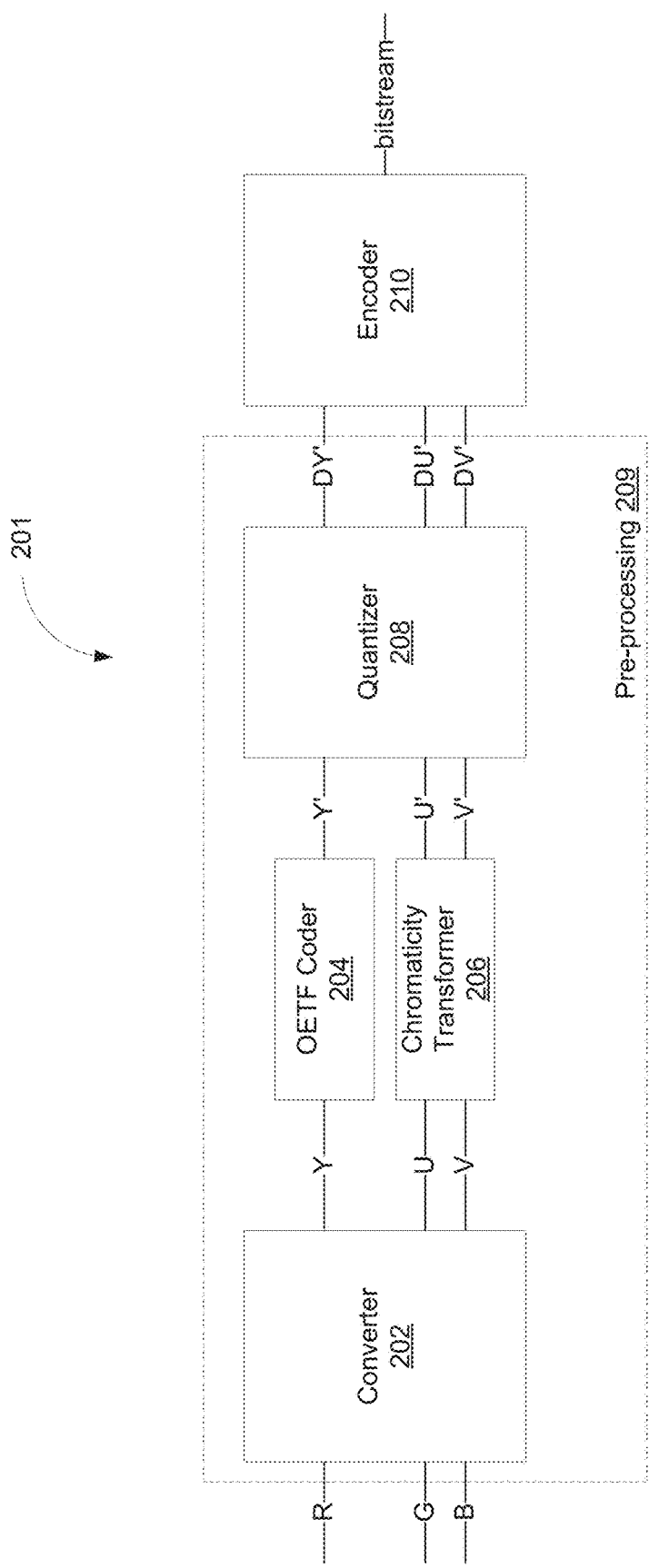
FIG. 2B is a schematic representation of the constant luminance coding pipeline with a dedicated chromaticity transform of FIG. 1 that may be utilized in the video processing pipeline of FIG. 2A.

At operation 100, an additive color model signal is converted into a uniform color space signal having chromaticity components or channels and luminance component or channel (performed by converter 202 of FIG. 2B). The red, green, blue (RGB) color model is an example of an additive color model in which red, green, and blue light are added together in various ways to arrive at a plurality of other colors. The RGB color model may be used for the sensing, representation, and display of images in electronic systems, such as monitors, TVs, etc. Input devices, such as video cameras, image scanners, video game consoles, digital cameras and the like may input an RGB signal into an output device, such as a TV, monitor, projector, or other display. The uniform color space may be referred to as a CIE color space or YUV color space that is used in a color image pipeline. It can encode a color image or video that can take human perception into account and allows for chrominance components enabling transmission errors or compression artifacts to be masked (as opposed to using a "direct" RGB representation of the image or video). The result of the conversion is a signal having a luminance component or channel, Y (representative of brightness) and chromaticity components or channels, U and V (representing color).

It should be noted that as described above, the conversion from the RGB color space to the YUV color space can be performed "directly" from RGB to YUV components or channels. However, in accordance with other embodiments, an intermediate conversion (not shown) can be performed to convert the RGB components or channels into an XYZ color space, where XYZ components may then be subsequently converted into the above-noted YUV components.

At operation 102, the chromaticity components and the luminance component are transformed, the transformation being performed by applying a chromaticity-specific transform to the chrominance components and a luminance-specific transform to the luminance component (chrominance and luminance transformations performed by transformers 206 and 204 of FIG. 2B, respectively). As illustrated in FIG. 2B, the U and V channels are transformed into U' and V' channels, where the chromaticity transform, in accordance with various embodiments maintains perceptual uniformity (which is not possible with conventional transformations utilized in conventional coding pipelines). It should be noted that the luminance component or channel is processed separately, e.g., with an opto-electric transfer function (OETF) (performed by OETF coder 204 of FIG. 2B) thereby resulting in a gamma compressed or encoded luma component, Y'. The separate treatment of the luminance and chromaticity components further aids in making compression more efficient.

At operation 104, the luma, Y', and chromaticity components, U' and V', are quantized (performed by quantizer 208 of FIG. 2B) resulting in a signal having DY', DU', and DV' components or channels. Quantization can refer to a lossy compression technique achieved by compressing a range of values, in this case, the luma and chromaticity component values, into a single quantum value, thereby reducing the number of colors utilized to represent an image.

At operation 106, the chromaticity components, DU' and DV', are encoded (performed by encoder 210 of FIG. 2B). The same is true of the quantized luma component, DY'. Encoder 210 may have a memory unit having computer code configured to cause a processor to apply a video codec, such as a high efficiency video coding (HEVC) codec, which is a successor to advanced video coding (AVC) also known as H.264. It should be noted that HEVC was originally designed for SDR and SCG content, and in conventional applications, is not optimal for coding HDR or WCG video sequences with regard to compression efficiency. However, the aforementioned chromaticity transform disclosed in the present disclosure converts the chromaticity components (U, V) into different values (U', V') that are more efficient for compression purposes (making better use of codewords at the (e.g., HEVC) codec level). Moreover, and as also previously discussed, the transformed chromaticity components are, as much as possible, made to be perceptually uniform, in order to preserve perception adaptation of the CIE or YUV color space.

FIG. 2A illustrates an example encoder and decoder architecture system 200 in which various embodiments may be implemented. System 200 can include encoder 210, a decoder 218, and a network or distribution channel(s) 216 to which both decoder 218 and encoder 210 may be communicably connected. Encoder 210 may include a memory 212 and a processor 214, while decoder 218 may also include a memory 220 and a processor 222. Decoder 218 may be a set-top box, tuner, etc. In operation, processor 214 of encoder 210 may execute computer instructions that are stored in memory 212, such as computer instructions for encoding a video sequence. That is, video content, which can be in the HDR or WCG format, is fed into encoder 210 and then compressed in preparation for storage and/or transmission. For example, processor 214 of encoder 210 may execute a process to encode a video sequence using the aforementioned HEVC codec, and transmit the encoded video sequence to decoder 218 over the network 216. Decoder 218, embodied as some type of receiving device, e.g., set-top box, tuner, etc., may receive the encoded HDR or WCG video sequence for decoding and presentation to display 224. That is, processor 222 of decoder 218 may execute computer instructions that are stored in memory 220, such as computer instructions for decoding the received HEVC coded video sequence.

As alluded to previously, system 200 also includes pre-processing and post-processing portions 209 and 223, respectively, in which one or more algorithms, in accordance with various embodiments, are executed (vis-à-vis converter 202, OETF coder 204, chromaticity transformer 206, and quantizer 2081. These components may be separate hardware and/or software components or functional aspects of the same hardware/software component. Although the corresponding components of post-processing portion 223 are not shown, it would be understood to include similar hardware and/or software for performing dequantization and an inverse color transform on an encoded video sequence. That is, an input bitstream may be decoded by decoder 218. By decoding the input bitstream, decoder 218 can convert the input bitstream into a series of transform coefficients, spatial prediction modes, and motion compensation vectors. It should be noted that the coding and decoding aspects of the coding pipeline need not involve a modified (e.g., HEVC) codec.

Figure 3:
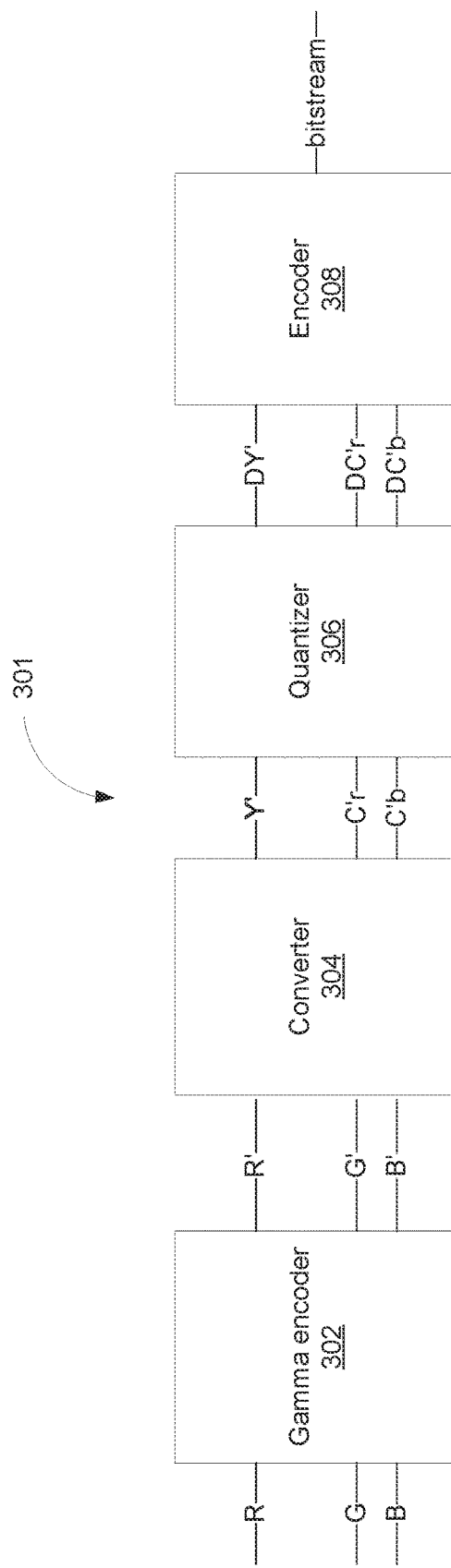
FIG. 3 is a schematic representation of a conventional non-constant luminance pipeline.

As also alluded to previously, conventional coding pipelines rely on non-constant luminance coding. FIG. 3 illustrates an example conventional coding pipeline 301 to provide an appreciation for the differences between the prior art and the various embodiments disclosed herein. Conventional coding pipeline 301 takes an image in RGB color space as input. Since each frame of the input video sequence must be processed individually, each step in the reference pipeline is applied to each frame in sequence. The input (RGB) image is first converted to double precision within the range [0,1]. Thus, a nonlinear transfer function (TF) is applied by gamma encoder 302 which redistributes the linear luminance of the R, G, and B channels to other code levels and results in nonlinear RGB components, denoted by R', G', and B'. It can be appreciated that small changes of luminance in lower intensities are perceived much better than in the high intensities. In addition, at least some of the subsequent processes in conventional coding pipeline 301 will be lossy, and there are a limited number of bits for storage. The TF preserves valuable information in the lower intensities by using a larger part of the bit space for these low values. If certain noticeable coding errors of an image were introduced in RGB, viewers would perceive them much more in the lower intensities than in the higher ones. If these errors were in the R'G'B' domain instead, they would be equally noticeable in all intensities once the image is converted back to RGB. Thus, the values for the lower intensities are expanded, while the values for the higher intensities are compressed together.

Converter 304 converts the R'G'B' components into the Y'C'bC'r color space in accordance with the BT.2020 specification. The Y'C'bC'r color space represents a luma component, Y', and the blue-difference, C'b, and the red-difference, C'r, chroma components. Quantizer 306 acts to quantize the Y', C'r, and C'b components, represented by CY', DC'r, and DC'b. Encoder 308 (e.g., applying the AVC/H.264 codec) encodes the quantized components to output an encoded bitstream that can be stored and/or transmitted as discussed previously.

In contrast to the coding pipeline 201, luma component Y' is representative of light intensity that is nonlinearly encoded based on gamma corrected RGB primaries. Coding errors introduced in luma can leak into the chrominance and lead to deviations that are observable not only in brightness but also in the colors rendered by a display—hence, the non-constant luminance aspect to conventional coding pipelines, such as coding pipeline 301. While this non-constant luminance coding pipeline is designed for coding SDR signals (e.g. RGB up to 100 nits in the BT.709 color space), it can be also repurposed for encoding HDR and WCG signals (e.g. RGB up to 10000 nits in the BT.2020 color space). However, this conventional coding pipeline still remains ill-designed as it continues to apply non-constant coding of luminance. In the HDR context, the coding of errors becomes more noticeable (e.g., coding artifacts in the color range become even more prominent in HDR content as opposed to SDR content).

Returning to FIG. 2B, and in contrast to conventional coding pipeline 301, the luminance component, Y, is explicitly expressed (separate from the chromaticity components U and V) in constant-luminance coding pipeline 201. Thus, any quantization and coding errors introduced to the luma component, Y', have an impact only on the luminance Y. In particular, leaking of compression errors into chrominance does not occur.

In particular, instead of converting images from the RGB color space to the Y'C'bC'r color space (as in conventional coding pipeline 301), the RGB signal is converted, e.g., to the XYZ color space (Eq. 1) and then to the YUV color space (Eq. 2). To return to the RGB color space (during decoding in post-processing portion 223 of system 200, an inverse of the matrix of Eq. 1 can be used (Eq. 3).

$$\begin{pmatrix} X \\ Y \\ Z \end{pmatrix} = \begin{pmatrix} 0.636958 & 0.144617 & 0.168881 \\ 0.262700 & 0.677998 & 0.059302 \\ 0.000000 & 0.028073 & 1.060985 \end{pmatrix} \begin{pmatrix} R \\ G \\ B \end{pmatrix} \quad \text{Eq. 1}$$

$$U = \frac{2x}{6y - x + 1.5} \quad x = \frac{X}{X + Y + Z} \quad \text{Eq. 2}$$

and $$V = \frac{4.5y}{6y - x + 1.5} \quad y = \frac{Y}{X + Y + Z}$$

$$X = \frac{Y}{y} x \quad x = \frac{9u}{6u - 16v + 12} \quad \text{Eq. 3}$$

and $$Z = \frac{Y}{y}(1 - x - y) \quad y = \frac{4v}{6u - 16v + 12}$$

In addition to the constant luminance aspect of coding pipeline 201, a dedicated chromaticity transform is provided to enable improved chrominance compression as well as improved overall compression efficiency. The dedicated chromaticity transform (applied by transformer 206 of FIG. 2B during operation 102 of FIG. 1) reduces coding errors in the chroma channels at a fixed bitrate by enlarging the distribution of code words for compressing. As can be appreciated, the dedicated chromaticity transform only affects the chromaticity components, U and V. The chromaticity transform takes these two components and returns the channels (U', V')=T(U,V), where T is a transform which will be described below.

It should be noted that chromaticity transform can be applied to images when quantizing them to lower bitdepths. In addition, the transform can be used to increase the picture quality at a fixed bitrate before compressing an image using a codec such as HEVC. Conventional transforms do not have the same effect of increasing the quality at the same bitrate for video sequences.

Figure 4:
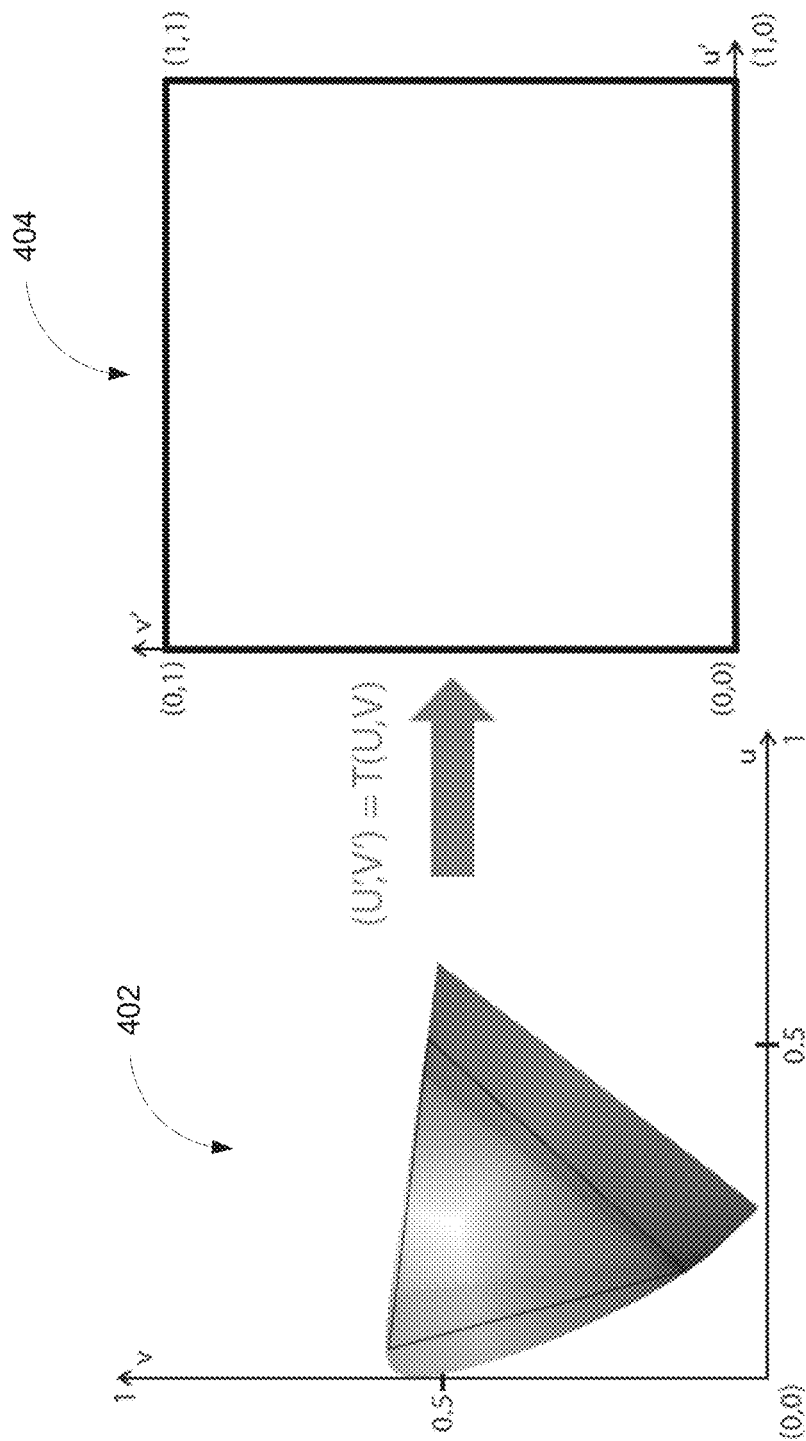
FIG. 4 is a conceptual representation of a chromaticity transform that may be utilized in the constant luminance coding pipeline with a dedicated chromaticity transform of FIG. 1.

The overall goal of the chromaticity transformation is illustrated in FIG. 4, which represents the conceptual representation of color (as a triangle with three primary colors red, green, and blue in the corners of the triangle and all possible color combinations in between those corners) transformed into a conceptual square (which reduces the number of wasted code words).

By way of explanation, the chromaticity coordinates of all the colors in a color space lie within the CIE diagram of the YUV color space (triangle 402). The corners of triangle 402 show the three primary coordinates RGB of the color space (e.g., BT.2020). All chromaticity values defined in this color space lies within the triangle 402. The three RGB primaries of a color space define the color gamut, or the range of all possible colors for that color space. The closer a point is to the boundary of the diagram, the more saturated a color is. Hence, the larger the triangle of a color space, the more saturated the three primaries are, and the larger the gamut is. It should be noted that footage captured and stored with BT.2020 primaries has the largest color gamut and is referred to as WCG (as opposed to, e.g., BT.709, which is an example of a SCG color space).

The dynamic range is defined as the ratio between the maximum and minimum light intensity. The higher the dynamic range, the larger the difference is between the maximum and the minimum intensity. Footage in SDR is typically in the brightness range of 0.1 to 100 nits (cd/m$^2$). In real life, however, light sources are well above 200 cd/m$^2$, and the night sky can be well below 0.1 cd/m$^2$. With HDR content, a minimum value can be as low as 0.005 cd/m$^2$ or as high as 10,000 cd/m$^2$.

Because RGB images are used as the input to coding pipeline 201, all the chromaticity components of pixels of an RGB image are located in the U-V chromaticity space of triangle 402 defined by the R, G, B, vertices. However, encoding in the U-V chromaticity space allows for the representation of many value pairs outside triangle 402, i.e., invalid chromaticity values. In order to reduce the wasting of such code words, various embodiments of the present disclosure map all (U,V) pairs into a rectangular are (e.g., unit square 404). In order to benefit from the perceptual uniformity of the U-V space for compression discussed above, no strong local deformations are introduced into the mapping of triangle 402 to unit square 404. The pair (u, v) can be defined as a chromaticity value of a pixel, where u∈U, v∈V. The (u, v) value for each pixel of an image will lie within this triangle or on its border.

As alluded to previously, one goal of the chromaticity transform disclosed herein is to provide the (e.g., HEVC) codec with a larger range of code words. The quantization step takes an image in the double precision format in the range [0,1] and quantizes it to 12 bit integer values in the range [0,4095], mapping the minimum input value (0) to 0 and the maximum input value (1) to 4095. Thus, the U and V components could each exploit the range [0, 1]. The chromaticity value (u, v) for each image pixel could be any value inside the unit square 404, which is defined by the points (0, 0), (0, 1), (1, 0) and (1, 1). This would not be the case based on how the YUV color space fits in the cartesian coordinate system. It should be noted that triangle 402 only takes up a relatively "small" part of the unit square.

Thus, the desired transform T is such that each possible value within triangle 402 defined by the three (e.g., BT.2020) primaries is mapped to some point in unit square 404, exploiting its area as much as possible—in other words transforming a triangle into a square. The transformed chromaticity value of each pixel (u', v'), and below, certain constraints of this transform are discussed.

As discussed previously, in a post-processing step 223 of FIG. 2, the inverse transform, $T^{-1}$, will have to be executed, meaning each transformed value (u', v') must be mapped back to the original value (u, v) when applying $T^{-1}$. In other words, the property represented below as Eq. 4 must hold, implying that T is invertible and that the chromaticity transform is a lossless step in coding pipeline 201.

$$\forall (u,v)((u,v)=T^{-1}(T(u,v))) \quad \text{Eq. 4.1}$$

It should be understood that transform T will lead to a large global distortion, drastically changing the shape of the triangle. Once the chromaticity transform is integrated into coding pipeline 201, the U' and V' channels are altered because coding and decoding are lossy and introduce errors. This means that $(u_{rec}, v_{rec})=(u, v)+e$, where e is a small error vector in an arbitrary direction. The YUV color space is nearly perceptually uniform, so the perceptual difference between $(u_{rec}, v_{rec})$ and (u, v) should only depend on the length of ∈, not the direction. This implies T should introduce a minimal local distortion, meaning that for all chromaticity values in close proximity to some value (u, v), their new distances to the transformed value (u', v)' can increase or decrease, but should all be more or less equal each other.

In accordance with one embodiment, as will be described below, the chromaticity transform may be based upon a direct transform. In accordance with another embodiment, also to be described below, the chromaticity transform may be based on a least squares transform. It should be understood that still other transforms may be utilized in accordance with other embodiments.

FIG. 5 illustrates examples of methods of subdividing triangle 402 of FIG. 4 in preparation for the transformation of the chromaticity values in accordance with various embodiments. Triangle 402 can be subdivided into a mesh, consisting of smaller triangles described by three vertices. To subdivide a triangle, midway points between the three corners of the triangle are marked and connected, thus forming four smaller triangles. A second subdivision can be performed for each of the smaller triangles, resulting in a total of 16 triangles. This process of subdividing can be repeated, where each new subdivision increases the number of triangles by a factor of four, so n subdivisions will create $4^n$ triangles, where n ∈N and n≥1. Triangles 502 and 504 are examples of main triangles having been subdivided three and four times, respectively. Triangle 502 has 64 smaller triangles after the three subdivisions, while triangle 504 has 256 smaller triangles as a result of performing four subdivisions. The result is a list of triangles, where each triangle can be stored by remembering three vertices in the mesh. Tr(a, b, c) denotes a triangle defined by the vertices a, b and c.

Once n is chosen, each of the $4^n$ smaller triangles are mapped into unit square 404. This results in some distortion. For each triangle Tr(a, b, c), the corresponding mapped triangle Tr(a, b, c') is stored. None of the mapped triangles should overlap one another.

When mapping a single chromaticity value, (u,v), each (u,v) value lies within the main YUV color space triangle 402 (main referring to the larger, non-subdivided triangle), thereby also lying within one of the smaller triangles created after subdividing triangle 402 (triangle 502). Once this triangle Tr(a, b, c) is found, the position p of the point (u,v) can be expressed by using its barycentric coordinates $\lambda_1, \lambda_2$ and $\lambda_3$ with respect to Tr(a, b, c), where $$\forall_i 1 \geq \lambda_i \geq 0$$

The correct position p' in the mapped triangle Tr(a', b', c') can, therefore, be found using the following formula:

$$p'=\lambda_1 a'+\lambda_2 b'+\lambda_3 c' \quad \text{Eq. 4.3}$$

This process is performed or each point individually. The barycentric coordinates are computed using the following formula:

$$\lambda_1 = \frac{(b_v - c_v)(p_u - c_u) + (c_u - b_u)(p_v - c_v)}{\det(T)} \qquad \text{Eq. 4.4}$$

$$\lambda_2 = \frac{(c_v - a_v)(p_u - c_u) + (a_u - c_u)(p_v - c_v)}{\det(T)}$$

$$\lambda_3 = 1 - \lambda_1 - \lambda_2$$

where the subscript of a point defines its u or v component, and $$T = \begin{pmatrix} a_u - c_u & b_u - c_u \\ a_v - c_v & b_v - c_v \end{pmatrix} \qquad \text{Eq. 4.5}$$

One property of a mapping by using barycentric coordinates is that it is invertible, meaning the inverse mapping of a point (u',v') at its position p' will place it at its original position p. As discussed previously, the transform should be invertible to allow for proper decoding of an image signal.

Figure 6:
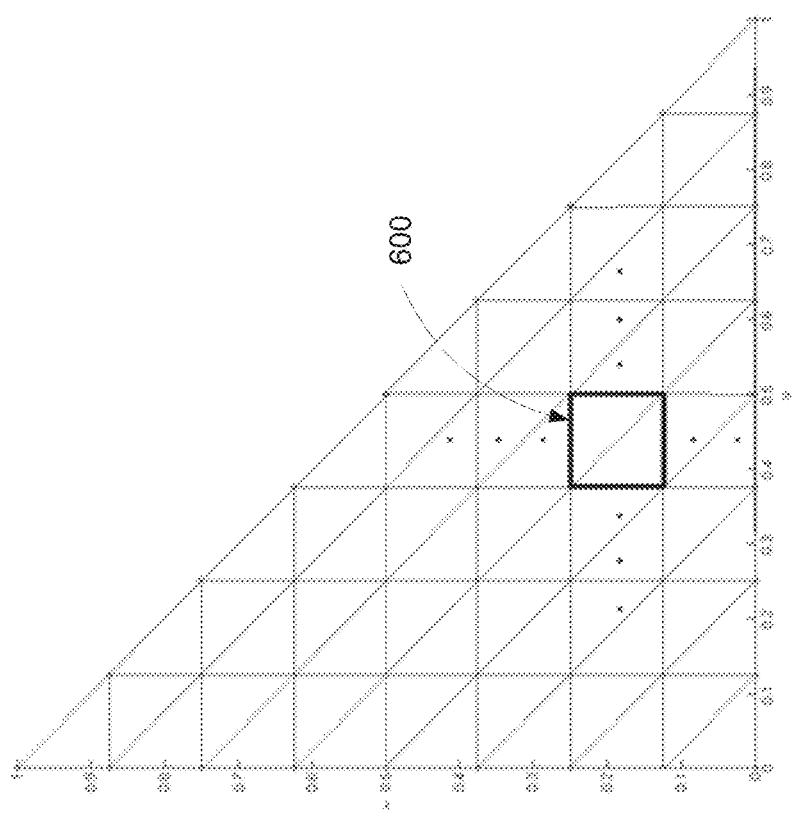
FIG. 6 is an example representation of the formation of a regular grid upon applying a transformation to each vertex of a mesh.

Finding the triangle in which a chromaticity point (u, v) is contained should be done in a "reasonable" amount of time, e.g., during live broadcasts, encoding should be performed quickly enough to prevent any lag/delay. In accordance with one embodiment, the three barycentric coordinates of each triangle may be calculated and tested whether the Eq. 4.2 holds. If so, the chromaticity point is inside the triangle. Individually testing each of the triangles resulting from the aforementioned subdivision(s) is inefficient. Accordingly, various embodiments rely on constant time-testing by performing the following:

Consider the linear transformation which transforms a given chromaticity value (u, v), $$(u, v)_{trans} = \begin{pmatrix} R_u - B_u & G_u - B_u \\ R_v - B_v & G_v - B_v \end{pmatrix}^{-1} ((u, v) - B), \qquad \text{Eq. 4.6}$$

where R, G and B stand for the three primary colors (three corners of triangle 402). If this transformation is applied to each vertex of the mesh, the main triangle would take up the bottom left half of the unit square 404. As seen in FIG. 6, the smaller triangles would be aligned in such a way that their two shorter sides would be either horizontal or vertical (in this example, n is three). If two neighboring triangles are grouped together to form a square 600, it would form a regular grid.

To find the corresponding triangle of a point (u,v), Eq. 4.3 to (u,v) rather than the mesh itself. For a specific subdivision value n, the square of the regular grid in which the transformed point $(U,V)_{trans}$ lies is trivial. Since all of the triangles are indexed and each square contains two triangles, the remaining step is to find which one of the triangles contains the point (u,v). This can be done by computing the barycentric coordinates of (u,v) with respect to the two triangles and then testing whether Eq. 4.2 holds.

During post-processing 223 (FIG. 2A), the position of each of the mapped chromaticity values (u',v') has to be located in the original mesh (e.g., FIG. 5). In accordance with one embodiment, a lookup table is utilized. That is, for each possible value in the transformed mesh, the lookup table specifies which position the value is mapped to in the original mesh. The individual triangles are then mapped to the unit square while obeying the properties of transform T.

As discussed above, one transform used in the transformation of chromaticity values may be a direct transform. When utilizing a direct transform, the mesh considered to be a collection of vertices, where each vertex will be copied and mapped to some new position inside the unit square. This type of transformation involves choosing four vertices on the boundaries of the main triangle and "stretching" it by "pulling" these vertices to the four corners of the square. It makes sense to choose the triangle's three corners, namely primaries R, G and B as three of the vertices to be pulled. A fourth vertex can be chosen, also on a boundary of the triangle. In accordance with one aspect of the present disclosure, the midway vertex P, which lies on the line connecting points/vertices R and B, may be chosen. Since n≥1, it is known that P exists.

Figure 7A:
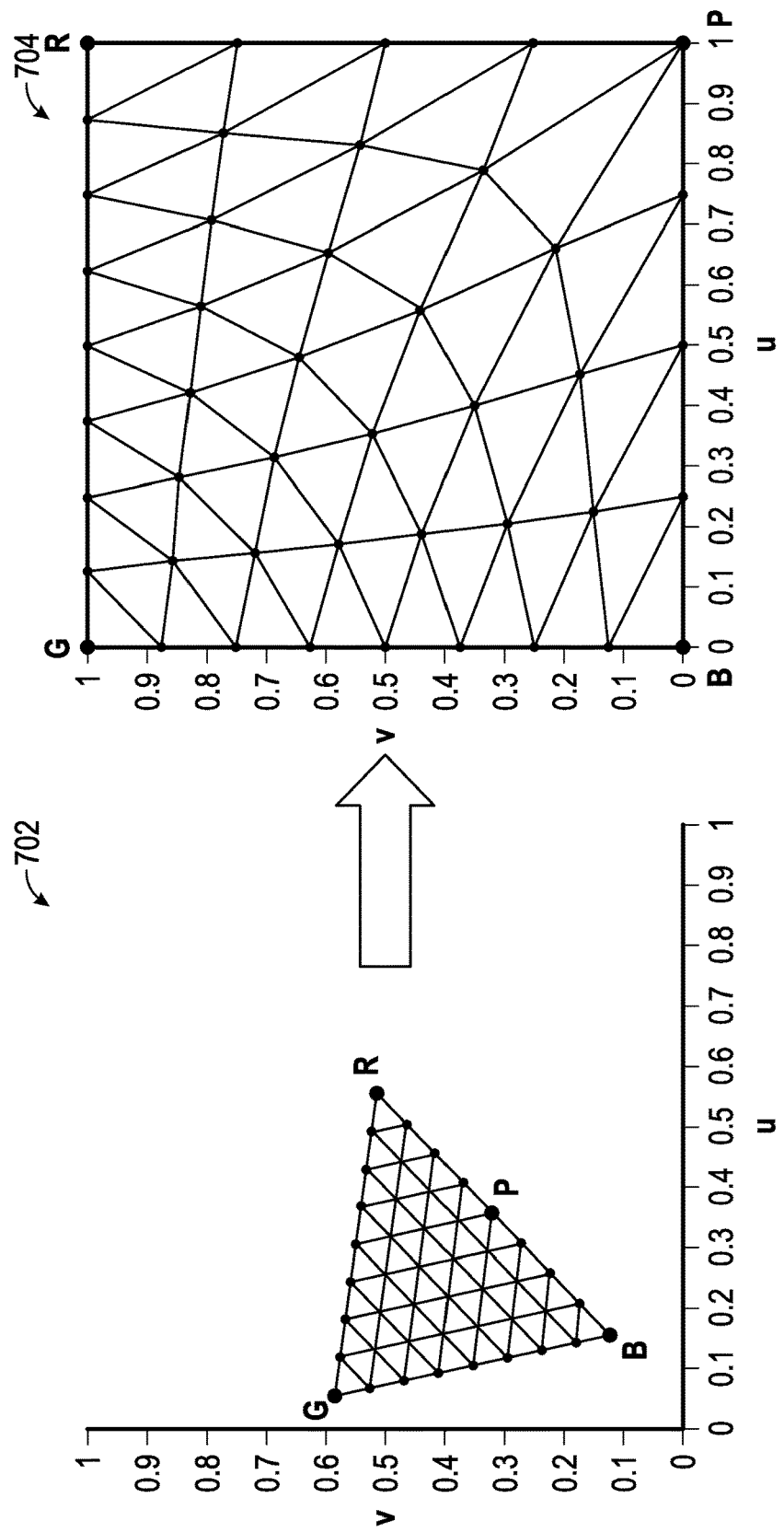
FIG. 7A is an example representation of a stretching step of a direct transformation utilized in transforming chromaticity values.

FIG. 7A illustrates an example of this conceptual stretching, where the four vertices R, G, B and P are shown on the main triangle 702 and how they are mapped. R can be pulled to the top right, G to the top left, B to the bottom left and P to the bottom right corner of unit square 704. In addition, the remainder of the vertices are marked, (highlighted with bolded dots) along the main triangle's boundaries. All of these m vertices taken together, form the boundary of a convex polygon P. Because these m vertices lie on a straight line between any two of the four vertices R, G, B, and P, they are mapped onto the corresponding boundaries of the unit square 704, equidistant from each other. For example, one of the vertices between G and B, abbreviated as v ∈GB, is mapped on to the left edge of the unit square, and the three vertices between B and P are mapped on to the bottom edge of the unit square. Again, these m vertices on the four edges of the unit square form a convex polygon P'. The rest of the vertices are now mapped from P to P' using mean value coordinates (MVC).

Figure 7B:
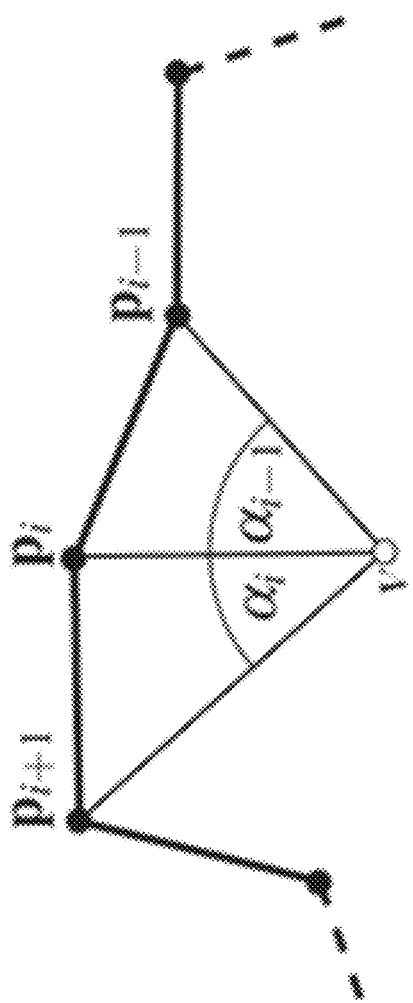
FIG. 7B is an example representation of a vertex connected to the boundary points of a polygon.

MVC can be described as a generalization of barycentric coordinates. Barycentric coordinates (alluded to previously) are used for triangles, which are essentially polygons with three vertices. However, MVC can be used for the same purpose with polygons having an arbitrary number of vertices. Therefore, a mapping of a vertex v inside polygon P to a new position inside the polygon P' using MVC $\lambda_i$ with respect to P is given by $$f(v) = \sum_{i=0}^{m-1} \lambda_i(v) f(pi) \qquad \text{Eq. 4.7}$$

where $p_i$ and f ($p_i$) denote boundary vertices of the polygons P and P'. FIG. 7B shows a vertex v connected to the boundary points of a polygon (along with angle definitions for MVC), which are ordered counter-clockwise. The MVC $\lambda_i$ of a vertex v is given by $$\lambda_i(v) = \frac{w_i}{\sum_{i=0}^{m-1} \lambda_i(v) f(pi)} \qquad \text{Eq. 4.8}$$

where $$w_i = \frac{\tan\left(\frac{\alpha_{i-1}}{2}\right) + \tan\left(\frac{\alpha_i}{2}\right)}{\|p_i - v\|} \qquad \text{Eq 4.9}$$

and $\alpha_i$ is the angle ∠ $p_i$, v, $p_{i+1}$.

One property of the mapping described in Eq. 4.7 is that it is invertible as well (again, for transform T), so that mapping a vertex from T' back to T will place it at its original location. Referring back to FIG. 7A, where the resulting triangles upon mapping the interior vertices of the main triangle 502 using MVC are shown. As would be understood by those of ordinary skill in the art, the smaller triangles proximate to the bottom right vertex P are much more distorted in comparison to those around vertex G. Since the human eye is more sensitive to small changes in the green tones rather than in the blue or red tones, it is desirable to have as little distortion as possible around vertex G. This is why the fourth vertex P is chosen to be along this edge of the main triangle 502. Moreover, this is the longest edge of the triangle, so choosing a vertex on another edge would likely result in a larger overall distortion.

Figure 7C:
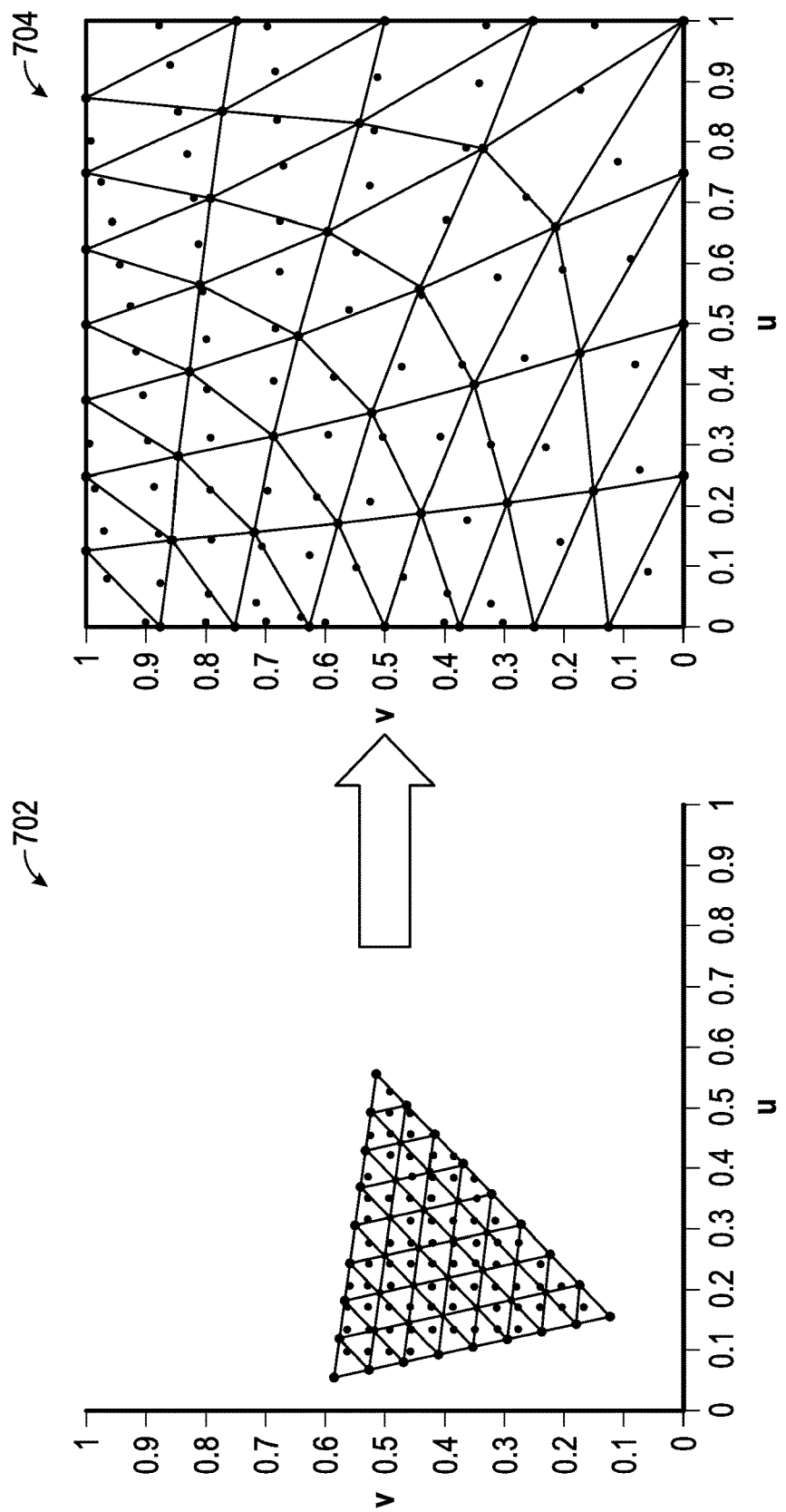
FIG. 7C is an example representation of equidistant points of a color space triangle being mapped to a unit square.

In sum, to implement a direct transform for the chromaticity transformation process, a mesh consisting of vertices and edges forming smaller triangles is created within the main color space triangle, e.g., triangle 702. The main triangle is stretched by selecting four vertices and pulling them towards the corners of the unit square, e.g., unit square 704. MVC can be used to map the interior vertices. Barycentric coordinates of a chromaticity value (u, v) with respect to a smaller triangle Tr(a, b, c) to map (u, v) to its corresponding triangle Tr(a', b', c'). FIG. 7C shows an example of equidistant points being mapped to the unit square using a direct transform as described herein. FIG. 7C shows how equidistant points (of the main triangle 702) are mapped to unit square 704, and the kind of distortion patterns that may arise. Distributing the vertices in an "optimal manner results in chrominance that is as perceptually uniform as possible.

Figure 8A:
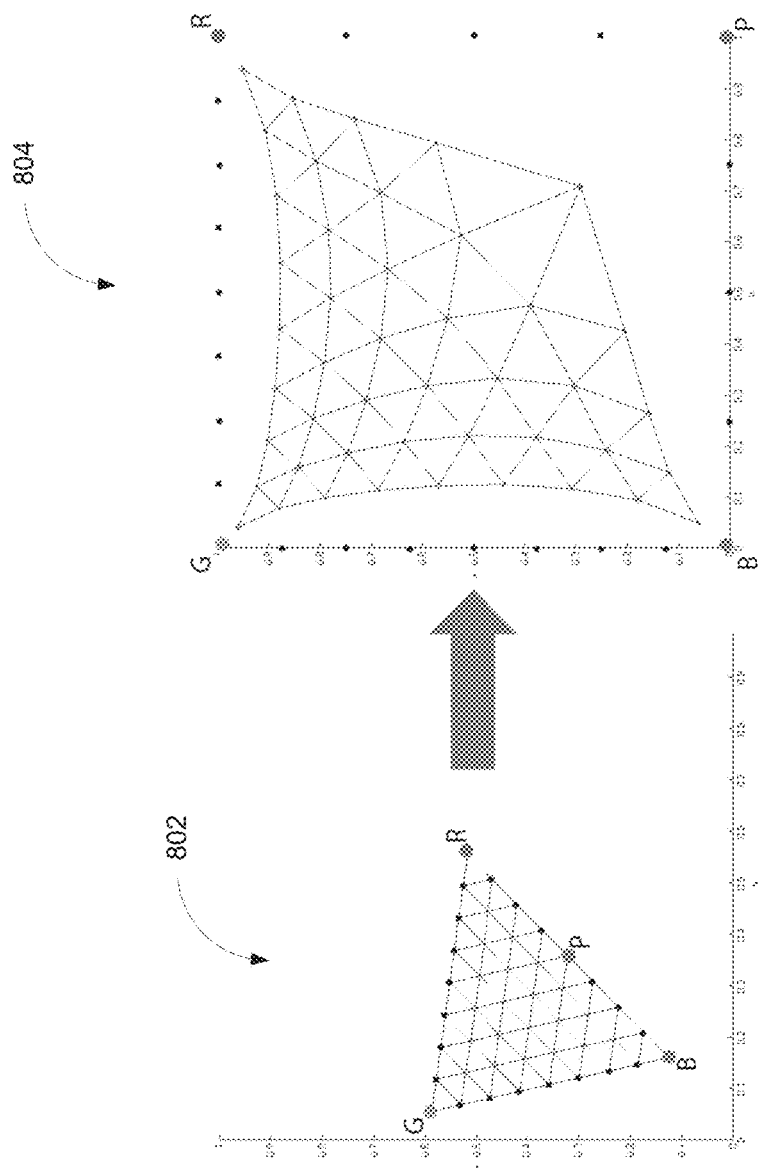
FIG. 8A is an example representation of a non-optimized least squares chromaticity transform that can be applied in the constant luminance coding pipeline with a dedicated chromaticity transform of FIG. 1.

In accordance with another embodiment, the chromaticity transform utilized in transforming the chromaticity values may be based on a least squares transform. FIG. 8A illustrates an example transformation of chromaticity values in color space triangle 802 to unit square 804 (which is a non-optimized example).

Like the procedure followed when utilizing a direct transform, the same four vertices R, G, B and P are selected on main triangle 802, and a mesh is generated. For this transform, there are three sets of constraints which are applied to the deformation of the mesh. Some constraints force main triangle 802 to be stretched as much as possible, while others try to preserve the shapes of the smaller triangles. It should be understood that not all constraints can be met perfectly, so the least squares transform involves a tradeoff.

These sets of constraints can be expressed in terms of energies, $F_1$, $F_2$ and $F_3$, where the overall sum of the energies should be minimized. The smaller an energy $E_i$ is, the better the i-th set of constraints is met. The example of FIG. 8 utilizes a subdivision value, n=3, and parameters $\alpha=\beta=\gamma=1$ (to be discussed below).

A first constraint can be referred to as an anchor constraint which specifies that the four vertices should be mapped to the same four corners of the unit square as in the direct transform. This is shown mathematically as follows:

$$\left\| B' - \binom{0}{0} \right\|^2 = 0, \left\| P' - \binom{1}{0} \right\|^2 = 0, \left\| R' - \binom{1}{1} \right\|^2 = 0, \left\| G' - \binom{0}{1} \right\|^2 = 0 \quad \text{Eq. 4.10}$$

The first energy term $E_1$ can be expressed by:

$$E_1 = \left\| B' - \binom{0}{0} \right\|^2 + \left\| P' - \binom{1}{0} \right\|^2 + \left\| R' - \binom{1}{1} \right\|^2 + \left\| G' - \binom{0}{1} \right\|^2 \quad \text{Eq. 4.11}$$

A second constraint can be referred to as a boundary constraint which specifies that the vertices on the boundaries of the main triangle 802 (highlighted in bold dots) should be placed somewhere on the boundaries of unit square 804, as is done in accordance with the direct transform. For example, a vertex v lying between the points B and G should be mapped onto the left edge of unit square 804, thereby making its u-coordinate, $v_u$, equal to zero. For all boundary vertices, these constraints are given by:

$$f(x) = \begin{cases} |v'_u - 0|^2 = 0, & \text{if } v \in \overline{BG}; \\ |v'_u - 1|^2 = 0, & \text{if } v \in \overline{RP}; \\ |v'_v - 0|^2 = 0, & \text{if } v \in \overline{BP}; \\ |v'_v - 0|^2 = 0, & \text{if } v \in \overline{GR} \end{cases} \quad \text{Eq. 4.12}$$

and the energy $E_2$ is given by:

$$E_1 = \sum_{\forall v \in \overline{BG}} |v'_u|^2 + \sum_{\forall v \in \overline{RP}} |v'_u - 1|^2 + \sum_{\forall v \in \overline{BP}} |v'_v|^2 + \sum_{\forall v \in \overline{BG}} |v'_v - 1|^2 \quad \text{Eq. 4.13}$$

The first two sets of constraints (anchor and boundary) attempt to stretch the main triangle in the same way as with direct transformation. However, and with respect to the main triangle's interior vertices, the goal of the third set of constraints (referred to as uniformity constraints) is to make the smaller triangles (post-subdivision of the main triangle) maintain their "shape" as much as possible and avoid becoming deformed. Every triangle Tr(a, b, c) has a circumcenter crm, which is a unique point that is equidistant to the vertices a, b and c. Thus, these three vertices lie on a circle around crm. The distances from the vertices of a mapped triangle Tr(a', b', c') to its new circumcenter should be equally minimized. Therefore, these constraints should lead to similar triangles. For all triangles in the set of triangles T, the total energy $E_3$ is equal to the sum of the squared distances from each vertex to its mapped triangles' circumcenters.

$$E_3 = \sum_{Tr \in T} \|a' - crm\|^2 + \|b' - crm\|^2 + \|c' - crm\|^2 \quad \text{Eq. 4.14}$$

The circumcenter crm can be expressed using barycentric coordinates $\lambda_1$, $\lambda_2$ and $\lambda_3$ by calculating:

$$crm = \lambda_1 a' - \lambda_1 b' - \lambda_2 c', \quad \text{Eq. 4.15}$$

where $$\lambda_1 = \overline{bc}(-\overline{bc}^2 + \overline{ac}^2 + \overline{ab}^2),$$

$$\lambda_2 = \overline{ac}(\overline{bc}^2 - \overline{ac}^2 + \overline{ab}^2),$$

$$\lambda_3 = \overline{ab}(\overline{bc}^2 + \overline{ac}^2 - \overline{ab}^2), \quad \text{Eq. 4.16}$$

with $\overline{v1v2}$ denoting the Euclidean distance between two vertices. To ensure that the sum of these three coordinates is equal to 1, they are normalized by dividing each one of them by the sum of the three values. The uniformity constraints do not necessarily preserve the shapes of the triangles in the mesh, but merely keep them "stiff" (i.e., less prone to deformation). A triangle could become severely deformed and still meet the uniformity constraints, since there are an infinite number of triangles with the same circumcenter. However, in combination with the two other constraints, the triangles will remain stiff and stay close to their original shape.

Ideally, a mesh should be deformed so that it utilizes the whole area of the unit square (in order to provide the codec with a larger range of code words). To accomplish this, the boundary and anchor constraints are defined, but at the same time, the local deformation is minimized, i.e., by defining the uniformity constraints. This results in the aforementioned trade-off between the three energy terms $E_1$, $E_2$, and $E_3$ derived in Eqs. 4.11, 4.13 and 4.14. In order to obtain an optimal result, the sum of the total energy, E, is minimized as follows:

$$E = \alpha E_1 + \beta E_2 + \gamma E_3 \quad \text{Eq. 4.17}$$

Additional parameters, $\alpha$, $\gamma$, and $\gamma$ are introduced to specify how much weight an energy term should have when solving Eq. 4. Initially, these three parameters are all equal to 1. If, for example, it would be desirable to enforce boundary constraints in $E_2$ and want the boundary vertices to be closer to the edges of the unit square, the value of $\beta$ can be increased. It can be appreciated that all three sets of constraints are linear. This makes the Eq. 4.17 easier to solve than if they had been nonlinear. Because of this property, Eq. 4.17 can be reformulated in matrix notation, and the final problem to solve is given by a linear system of equations:

$$\underset{x}{\operatorname{argmin}} \|Ax - b\|^2 \text{ or } \tilde{x} = (A^T A)^{-1} A^T b, \quad \text{Eq. 4.18}$$

which can be solved in the least squares sense. Here, x is the solution vector containing the values for the mapped vertices. For k vertices, x must contain the u and v coordinates of each vertex, so $x \in R^{2k}$. The solution results in vertex distribution that is as perceptually uniform as possible. The mapped vertices v' are aligned the following way in x:

$$x = \begin{pmatrix} v_{1u} \\ v_{1v} \\ \vdots \\ v_{ku} \\ v_{kv} \end{pmatrix} \quad \text{Eq. 4.19}$$

With a total of l individual constraints, we have $A \in R^{l \times 2k}$ and $b \in R^l$, which hold the individual constraints for each value in x. Since each vertex is subject to multiple constraints, $l \geq 2k$, so the system of equations is overdetermined.

The resulting shape of a least squares transform as contemplated herein is illustrated in unit square 804. The distorted triangle covers a large area of the unit square, but not the entire area. Comparing the direct transform with the least squares transform, the trade-offs between the two can be appreciated. By using the direct transform, entirety of the unit square can be leveraged, but the triangles in the mesh are severely distorted. In the least squares transform, the full area of the unit square is not necessarily utilized, but there is less distortion involved with respect to the mapped triangles.

As mentioned with respect to Eq. 4.17, the resulting transform can be modified, depending on which constraints a user wishes to optimize by changing the parameters $\alpha$, $\beta$, and $\gamma$. The least squares transform is considered non-optimized if these values are not modified. For example, if a user wishes to cover a larger area of the unit square, the uniformity constraints can be discarded. To do this, $\alpha$ and $\beta$ values can be increased. An example of this transform, a so-called optimized least squares transform, is illustrated as unit square 806 in which we set the parameters $\alpha = \beta = 3$ and $\gamma = 1$. When comparing the non-optimized least squares transform (shown as unit square 804) to the optimized version (shown as unit square 806), it can be seen how the mesh changes its shape.

Video or image content in WCG such as P3 or BT.2020 has a wider gamut and therefore requires more bits for storage and transmission. In accordance with various embodiments, systems and methods provide improved image quality at a fixed given bitrate, or alternatively, providing the ability to select a certain desired image quality around by choosing a certain image quality and lowering the bitrate. This optimization can be realized by utilizing a called chromaticity transform which involves the transformation of the two chromaticity channels, U and V. If the YUV color space is used for coding, fewer code words are provided to the codec than it can actually accept. If the distribution of code words in U and V is enlarged, certain coding errors are expected to become less prominent in the reconstructed signal, and due to the chromaticity transform disclosed herein, the picture quality of the video and image content is improved. However, despite enlarging the distribution of code words (which translates into providing the codec with more information, compression is made more efficient, negating the effects of increased bitrate (e.g., at the same bitrate, a ½ dB improvement or better can be achieved for color) leading to color preservation and better overall color quality of the content.

Figure 9:
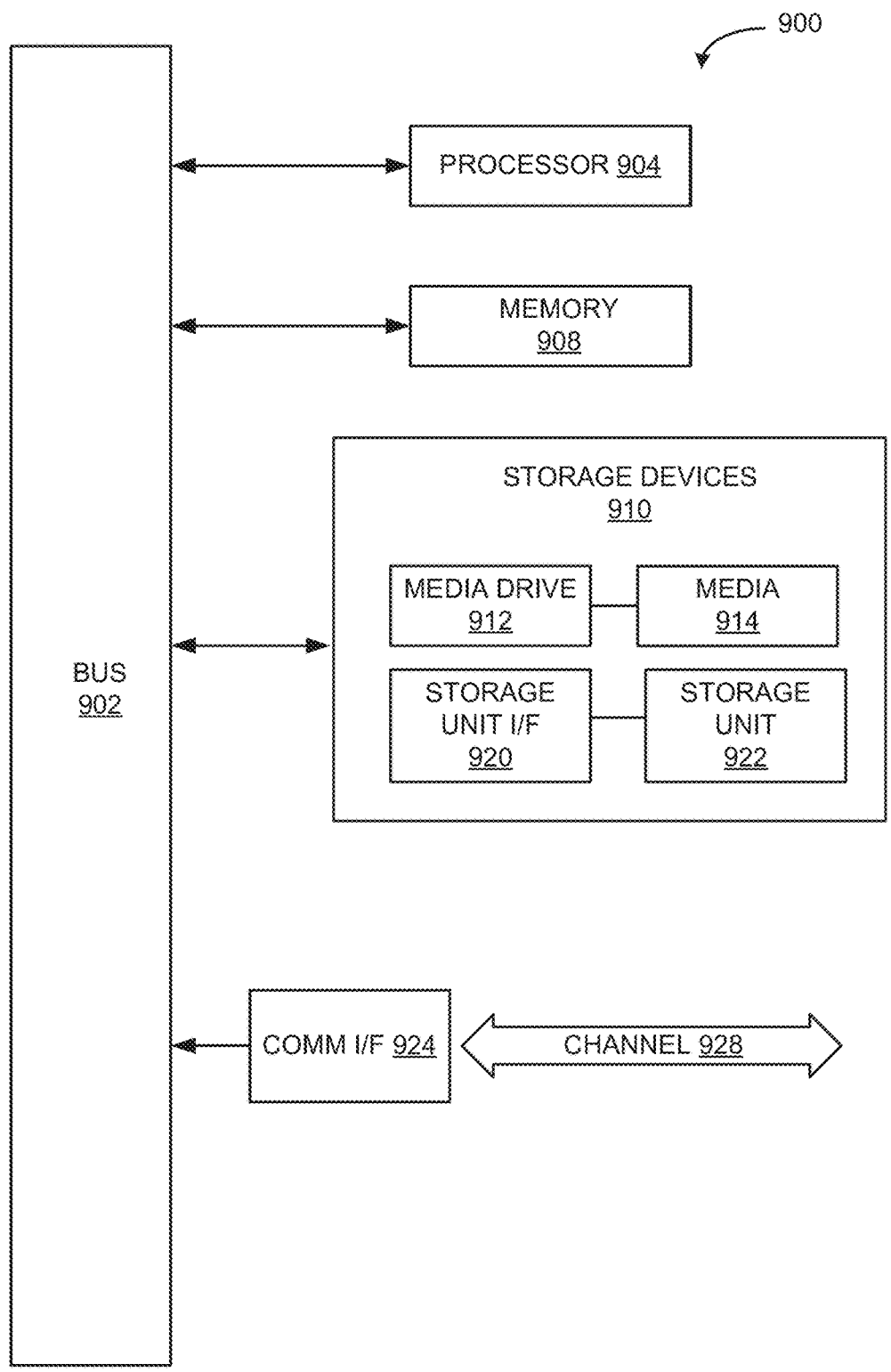
FIG. 9 is an example computing component that may be used to implement various features of embodiments described in the present disclosure.

FIG. 9 illustrates an example computing component that may be used to implement various features of the system and methods disclosed herein, such as the aforementioned features and functionality of one or more aspects of pre-processing and post-processing portions 209 and 223, respectively, of video coding pipeline 200.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example navigation systems, portable computing devices, and other electronic devices that might include some form of processing capability.

Computing component 900 might include, for example, one or more processors, controllers, control components, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing component 900 or to communicate externally.

Computing component 900 might also include one or more memory components, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 914 might include, for example, a hard disk, an integrated circuit assembly, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot, a PCMCIA slot and card, and other fixed or removable storage units 922 and interfaces 920 that allow software and data to be transferred from the storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
converting an additive color model signal into a uniform color space signal having chromaticity components and a luminance component;
transforming the chromaticity components by applying a chromaticity-specific transform to the chromaticity components, wherein the chromaticity-specific transform maps a main triangular representation of the chromaticity components in the uniform color space to a four-sided polygonal representation of the chromaticity components in the uniform color space;
transforming the luminance component by applying a luminance-specific transform to the luminance component;
quantizing the transformed chromaticity components and luminance component; and
encoding the quantized chromaticity components and luminance component.

2. The computer-implemented method of claim 1, wherein the additive color model signal comprises a red-green-blue (RGB) color model signal.

3. The computer-implemented method of claim 1, wherein the uniform color space signal comprises a YUV color space signal.

4. The computer-implemented method of claim 3, wherein mapping a main triangular representation of the chromaticity components in the uniform color space comprises subdividing the main triangular representation of the chromaticity components in the YUV color space into a mesh comprising a plurality of secondary triangles.

5. The computer-implemented method of claim 4, wherein each of the vertices of the main triangular representation comprises one of the primaries of the additive color model.

6. The computer-implemented method of claim 5, further comprising defining a midway vertex between two of the primaries of the additive color model.

7. The computer-implemented method of claim 6, further comprising mapping each of the vertices of the main triangular representation and the defined midway vertex to a rectangular representation of the chromaticity components in the YUV color space.

8. The computer-implemented method of claim 7, wherein the rectangular representation comprises a unit square.

9. The computer-implemented method of claim 7, wherein respective vertices of each of the plurality of secondary triangles is mapped to the rectangular representation of the chromaticity components in the YUV color space using mean value coordinates.

10. The computer-implemented method of claim 9, wherein values of each of the chromaticity components in the YUV color space are mapped to the rectangular representation thereof using barycentric coordinates corresponding to the values of each of the chromaticity components.

11. The computer-implemented method of claim 6, further comprising mapping each of the vertices of the main triangular representation and the defined midway vertex to a four-sided polygonal representation of the chromaticity components in the YUV color space.

12. The computer-implemented method of claim 11, further comprising applying at least one of a plurality of constraints affecting the mapping of each of the vertices of the main triangular representation, each of the vertices of each of the plurality of secondary triangles, and the defined midway vertex to the four-sided polygonal representation.

13. The computer-implemented method of claim 12, further comprising adjusting characteristics of at least one of the plurality of constraints to modify the chromaticity-specific transform.

14. The computer-implemented method of claim 1, wherein the luminance-specific transform comprises an opto-electrical transfer function.

15. A non-transitory computer readable medium having computer executable program code embodied thereon, the computer executable program code configured to cause a processor to:
decode quantized color and brightness components of an input bitstream carrying an image signal represented by a first color space model having brightness and color components;
dequantize the quantized color and brightness components;
apply a first inverse transform to the dequantized color component, wherein the first inverse transform maps a four-sided polygonal representation of the color component in the first color space model to a triangular representation of the color components in the first color space model;

apply a second inverse transform to the dequantized brightness component separately from applying the first inverse transform to the color component; and convert the image signal represented by a first color space model into that represented by a second color space model, the second color space model being an additive color space model.

16. The non-transitory computer readable medium of claim 15, wherein the first inverse transform comprises one of an inverse direct transform or an inverse least squares transform, wherein the color and brightness components have been previously transformed to increase the number of code words available to a video codec for compressing the image signal.

17. The non-transitory computer readable medium of claim 16, wherein the first color space model comprises a YUV color space model, the second color space model comprises a red-green-blue (RGB) color space model, and the video codec comprises a high efficiency video coding (HEVC) codec.

18. The non-transitory computer readable medium of claim 15, wherein the image signal comprises one of a standard dynamic range (SDR) image signal, a high dynamic range (HDR) image signal, a standard color gamut (SCG) image signal, or a wide color gamut (WCG) image signal.

19. A system, comprising:
a processor comprising:
   a converter,
   a first transformer,
   an opto-electrical transfer function, and
   an encoder;
a non-transitory computer-readable medium coupled to the converter, the first transformer, the opto-electrical transfer function, and the encoder, the non-transitory computer-readable medium having computer executable program code embodied thereon, the computer executable program code configured to cause a processor to:
convert an image signal represented by a first color space model into that represented by a second color space model having brightness and color components using the converter;
apply a first transform to the color component using the first transformer, wherein the first transformer maps a triangular representation of the color components in the second color space model to a four-sided polygonal representation of the color components in the second color space model;
apply a second transform to the brightness component using the encoder separately from applying the first transform to the color component;
quantize the transformed color and brightness components using the quantizer; and
encode the quantized color and brightness components and output a bitstream using the encoder.

20. The system of claim 19, wherein the first transform is invertible.

* * * * *